(12) United States Patent
Palermo et al.

(10) Patent No.: US 11,537,419 B2
(45) Date of Patent: Dec. 27, 2022

(54) VIRTUAL MACHINE MIGRATION WHILE MAINTAINING LIVE NETWORK LINKS

(71) Applicant: Intel Corporation, Santa Clara, CA (US)

(72) Inventors: Stephen T. Palermo, Chandler, AZ (US); Krishnamurthy Jambur Sathyanarayana, Shannon (IE); Sean Harte, Limerick (IE); Thomas Long, Shannon (IE); Eliezer Tamir, Beit Shemesh (IL); Hari K. Tadepalli, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 864 days.

(21) Appl. No.: 15/395,884

(22) Filed: Dec. 30, 2016

(65) Prior Publication Data

US 2018/0189087 A1    Jul. 5, 2018

(51) Int. Cl.
*G06F 9/455* (2018.01)
*H04L 67/142* (2022.01)

(52) U.S. Cl.
CPC ........ *G06F 9/45558* (2013.01); *H04L 67/142* (2013.01); *G06F 2009/4557* (2013.01); *G06F 2009/45575* (2013.01); *G06F 2009/45595* (2013.01)

(58) Field of Classification Search
CPC ....... G06F 9/46; G06F 9/45558; H04L 67/10; H04L 67/142
See application file for complete search history.

(56) References Cited

U.S. PATENT DOCUMENTS

| 8,396,216 B2* | 3/2013 | Pinder | H04N 7/163 380/200 |
| 10,404,579 B1* | 9/2019 | Biemueller | H04L 45/16 |
| 2007/0276954 A1* | 11/2007 | Chan | H04N 21/222 709/231 |
| 2012/0278804 A1* | 11/2012 | Narayanasamy | H04L 47/15 718/1 |

(Continued)

OTHER PUBLICATIONS

Search Note on SDP and packet signaling, limited to before Dec. 1, 2016 (Year: 2016).*

*Primary Examiner* — Kenneth Tang
*Assistant Examiner* — Kevin X Lu
(74) *Attorney, Agent, or Firm* — Hanley, Flight & Zimmerman, LLC (57) ABSTRACT

Disclosed is a source host including a processor. The processor operates a virtual machine (VM) to communicate network traffic over a communication link. The processor also initiates migration of the VM to a destination host. The processor also suspends the VM during migration of the VM to the destination host. The source host also includes a live migration circuit coupled to the processor. The live migration circuit manages a session associated with the communication link while the VM is suspended during migration. The live migration circuit buffers changes to a session state and transfers the buffered session state changes to the destination host for replay after the VM is reactivated on the destination host. The live migration circuit keeps the sessions alive during migration to alleviate connection losses.

26 Claims, 3 Drawing Sheets

(56) References Cited

U.S. PATENT DOCUMENTS

| | | | | |
|---|---|---|---|---|
| 2014/0143366 A1* | 5/2014 | Thakkar | ............... | G06F 13/28 |
| | | | | 709/212 |
| 2014/0297800 A1* | 10/2014 | Mutschler | ............ | G06F 9/4856 |
| | | | | 709/217 |
| 2015/0142938 A1* | 5/2015 | Koponen | ............ | H04L 63/0218 |
| | | | | 709/222 |
| 2015/0326542 A1* | 11/2015 | Serebrin | ............ | G06F 9/45558 |
| | | | | 713/160 |
| 2015/0331715 A1* | 11/2015 | Sathyanarayana | ............ | |
| | | | | G06F 9/45558 |
| | | | | 709/226 |
| 2015/0370596 A1* | 12/2015 | Fahs | ............ | G06F 9/46 |
| | | | | 718/1 |
| 2017/0063674 A1* | 3/2017 | Maskalik | ............ | H04L 45/38 |
| 2017/0288961 A1* | 10/2017 | Li | ............ | H04L 41/5051 |
| 2017/0371835 A1* | 12/2017 | Ranadive | ............ | G06F 15/17331 |
| 2018/0139101 A1* | 5/2018 | Puri | ............ | G06F 9/4856 |
| 2018/0191838 A1* | 7/2018 | Friedman | ............ | H04L 67/148 |
| 2018/0203721 A1* | 7/2018 | Fahs | ............ | G06F 9/45558 |
| 2018/0246756 A1* | 8/2018 | Abali | ............ | G06F 9/4856 |
| 2019/0286469 A1* | 9/2019 | Lakshmikantha | .. | G06F 9/45558 |
| 2019/0354387 A1* | 11/2019 | Zhou | ............ | G06F 13/24 |

\* cited by examiner

FIG. 3 ers, natural disasters at a physical location, etc. Some applications manage user data in real time. Transferring such real time applications may result in interruption of user services. For example, a transfer of an application managing secure connections for voice data may result in connection timeouts and termination of associated services (e.g. dropped calls). Further, transferring active applications may be impractical if such applications are updated quickly and constantly. In such cases, updates at a source location may occur more quickly than the time needed to transfer previous updates between the source location and the destination. This may necessitate that the application be terminated for transfer.

BRIEF DESCRIPTION OF THE DRAWINGS

The concepts described herein are illustrated by way of example and not by way of limitation in the accompanying figures. For simplicity and clarity of illustration, elements illustrated in the figures are not drawn to scale unless otherwise noted.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, such feature, structure, or characteristic can be employed in connection with another disclosed embodiment whether or not such feature is explicitly described in conjunction with such other disclosed embodiment.

The disclosed embodiments may be implemented, in some cases, in hardware, firmware, software, or any combination thereof. The disclosed embodiments may also be implemented as instructions (e.g. a computer program product) carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Disclosed herein are mechanisms to live migration of VMs, while maintaining active communication links. For example, a VM at a source host may actively manage secure traffic via a secure session. The source host and/or associated hypervisor may determine to transfer the VM to a destination host by suspending the VM and forwarding the VM's memory and system state to the destination host. Upon suspension of VM activity, management of communication link and associated sessions is delegated to a live migration circuit, such as a Field Programmable Gate Array (FPGA), Application Specific Integrated Circuit (ASIC), etc. The live migration may take any actions needed to keep the links and sessions alive while the VM is transferred. For example, the live migration circuit may perform session related signaling, buffer session state changes, manage security encryption of session related data, etc., while the VM is being transferred. In some aspects, the live migration circuit may intelligently drop any packets that are not needed to keep the links active. While dropping such packets may result in some lost user data (e.g. loss of some voice data and a temporary reduction of sound quality for the user), dropping such packets may reduce the updates needed at the source host without terminating the active sessions, thereby increasing overall transfer speed. Further, delegating session management to the live migration circuit may free processor resources to speed the VM migration. Delegating session management to the live migration circuit may also increase the deterministic behavior of live migration and reduces jitter which may be beneficial for real-time applications. Once the VM has be migrated and initialized at the destination, the destination may indicate to the source live migration circuit that the VM has been successfully restored at the destination host. Upon receiving the indication, the live migration circuit at the source host may switch active traffic to a live migration circuit at the destination host. The source live migration circuit may also transfer any buffered session state changes to the destination live migration circuit. The destination host and live migration circuit replay the buffered session state changes to the VM at the destination, which reinstates the state in the VM to the latest state for maintaining the communication sessions. All the above communication may be carried out on a secure communication link. The VM at the destination host may be updated accordingly prior to transferring session management and communication to the VM at the destination host.

Figure 1:
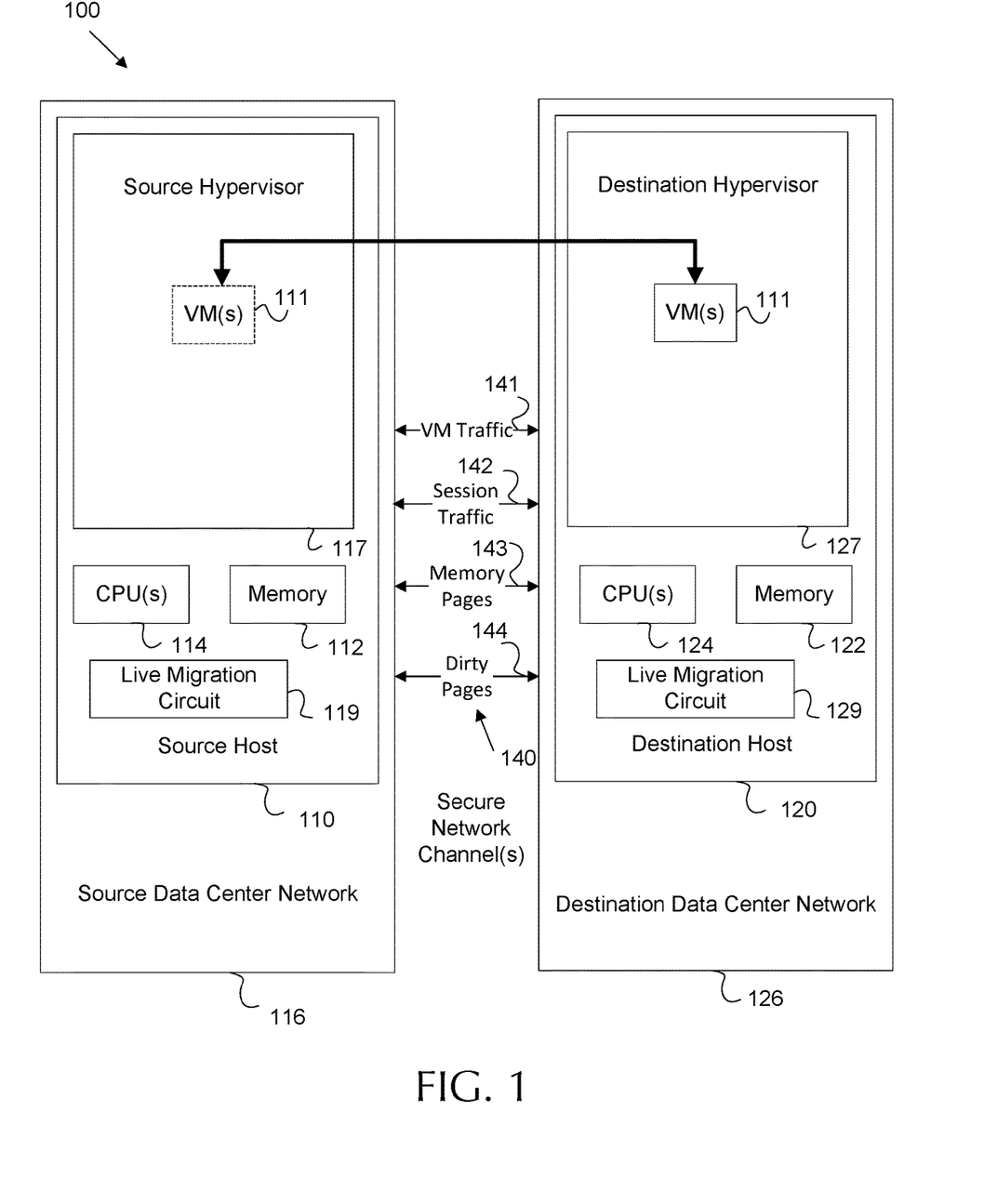
FIG. 1 is a block diagram of an embodiment of a multi-data center system for migrating a live virtual machine (VM) without session interruption.

FIG. 1 is a block diagram of an embodiment of a multi-data center system 100 for migrating a live virtual machine (VM) 111 without session interruption. The system 100 includes a source data center network 116 for operating a plurality of VMs. The source data center network 116 is configured to migrate a VM 111 to a destination data center network 126. The source data center network 116 includes a plurality of hosts including a source host 110. The source host 110 employs a source hypervisor 117 to operate and migrate the VM 111. The source host 110 also includes CPUs 114 and memory 112 to support operating the source hypervisor 117. The source host 110 also includes a live migration circuit 119 for keeping communication sessions alive while the VM 111 is suspended for migration. The destination data center network 126 includes a destination host 120, a destination hypervisor 127, CPUs 124, memory 122, and a live migration circuit 129, which are substantially similar to the source data center network 116, the source host 110, the source hypervisor 117, the CPUs 114, the memory 112, and the live migration circuit 119, respectively.

A data center network, such as the source data center network 116 and the destination data center network 126, is a group of networked computer servers, which may be housed in a data center facility. The servers are employed by tenants for storage, processing, and/or distribution of data. Data center networks 116 and 126 may be employed for performing telecommunications services, storing data for transmission to tenants upon request, and hosting other software based services. A server may be configured as a host, such as source host 110 and destination host 120. A host is any network device (e.g. server) configured to offer information resources, services, and/or applications to users or other network nodes.

Hosts 110 and 120 employ both software/firmware and hardware resources. Hosts 110 and 120 hardware resources include central processing units (CPUs) 114 and 124, memory 112 and 122, and live migration circuits 119 and 129, respectively. CPUs 114 and 124 are general purpose processing circuits configured to execute stored instructions (e.g. computer program products) to operate software. Memory 112 and 122 are any memory components configured to act as a machine-readable storage medium to store instructions for CPUs 114 and 124, respectively. Memory 112 and 122 may be implemented as read only memory (ROM), random access memory (RAM), cache, storage registers, etc. Live migrations circuits 119 and 129 are discussed in more detail below.

Hosts 110 and 120 also include hypervisors 117 and 127, which may operate on CPUs 114 and 124, respectively. Hypervisors 117 and 127 are operating environments for managing other software applications, such as VMs. A hypervisor 117 and 127 may act as a platform for managing the execution of guest operating systems (e.g. VMs) and/or communications between guest operating systems. A hypervisor 117 and 127 may also manage elastic provisioning of hardware resources, for example by moving VMs or portions of VMs between servers and/or between data centers. For example, the hypervisor 117 on the host 110 may determine to move VM 111, and hence act as a source hypervisor 117 and a source host 110, respectively. The hypervisor 127 on host 120 may receive the VM 111, and hence act as a destination hypervisor 127 and a destination host 120, respectively.

A VM 111 is an emulated computer system capable of providing functionality of a physical computer system. For example, a VM 111 may act as a switch for communications between users, such as a base station for mobile communications. As another example, a VM 111 may provide a service to provide voice over internet protocol (VoIP) to users. The VM 111 may maintain multiple communication links with multiple users. The VM 111 and/or the associated hypervisor may maintain and manage such communication links as sessions, where a session is a semi-permanent interactive information exchange. The VM 111 may communicate network traffic over such communication links. The sessions may operate under security protocols, such as Internet Protocol Security (IPSec), Secure Socket Layer (SSL), etc., to prevent access to network traffic by malicious entities. Such security protocols may be stateful and may time out and terminate in case of state misalignment and/or a lack of a response. Such a time out/termination may result in the termination of the corresponding session and communication link. Accordingly, movement of a VM 111 may result in lost sessions, and hence dropped calls, lost data, etc.

Live migration circuit 119 is employed to maintain sessions while VM 111 is transferred between a source host 110 and a destination host 120. The live migration circuit 119 is any dedicated circuit for keeping sessions alive while the VM 111 is suspended during migration. The live migration circuit 119 may be implemented as an FPGA, an ASIC, or any other dedicated processing circuit. The live migration circuit 119 may also be used to offload certain algorithms that are executed in the hypervisors 117 and 127 for migration on both source and destination platforms. Such algorithms may include dirty page 140 tracking, converting memory pages 143 to network packets on the source platform (e.g. source hypervisor 117), and restoring memory pages 143 on the destination platform (e.g. destination hypervisor 127) by converting the network packets back to VM 111 memory pages 143. By offloading such functionality to the live migration circuit 119, determinist and reliable migration may be achieved. Further, executing migration algorithms in the hardware may also help transfer of pages at high throughput, leading to shorter total live migration times. As an added benefit, offloading such functionality may also free up CPU 114 and 124 cycles for executing the migration algorithms.

For example, the source host 110 and/or the source hypervisor 117 operating on the CPUs 114 may determine to migrate the VM 111 to the destination hypervisor 127 on the destination host 120. Such migration may be performed as a live migration. Hence, the VM 111 should be moved in a manner that has minimal impact on the users interacting with VM 111 and may not require VM 111 reconfiguration at the destination hypervisor 127. The source hypervisor 120 may migrate the VM 111 in a multi-phase process including pre-migration, migration, and post-migration. During pre-migration, a copy of VM 111 is transferred to the destination hypervisor 127. The VM 111 copy is forwarded as memory pages 143 that include the memory of the VM 111 prior to pre-migration. The VM 111 continues to operate on the source hypervisor 117 while the copy of VM 111 is set up at the destination hypervisor 127, resulting in changes to VM 111 memory at the source hypervisor 117. Any memory page altered after transfer of the VM 111 copy is considered a dirty page 144. Dirty pages 144 are also forwarded to the destination hypervisor 127 to allow for update of the VM 111 copy. The source hypervisor 117 may then suspend the VM 111 during migration of the VM 111 to the destination host 120. Upon suspension of the VM 111, a final session state for each session may be forwarded to the destination hypervisor 127 as session traffic 142, where session traffic is any data communicated to manage a session.

The live migration circuit 119 manages the sessions associated with the communication links while the VM 111 is suspended during migration. For example, the live migration circuit 119 may buffer any changes to the session state employed to maintain the corresponding sessions while the VM is suspended. The live migration circuit 119 may also perform signaling for the session while the VM is suspended during migration. In some aspects, the live migration circuit 119 drops network traffic unrelated to session management while the VM is suspended during migration. The dropping of such network traffic may have an effect on the quality of the connections, but may not result in a disconnect. The live migration circuit 119 may also manage security encryption of session data for the communication links while the VM is suspended during migration. The actions taken by the live migration circuit 119 may vary depending on the needs to the VM 111 and/or associated sessions. The live migration circuit 119 may be programmed with such actions (e.g. based on administrator input, based on instructions stored in memory 112, etc.) prior to migration. It should be noted that session management may be handled solely by the live migration circuit 119 during migration. The CPUs 114 may not manage the sessions while the VM is suspended during migration. This may provide more CPU 114 resources to speed the migration processor. The time period where the VM 111 is suspended may be referred to as downtime.

While the live migration circuit 119 is managing the sessions, the destination hypervisor 127 reactivates the VM 111. Upon activation, the live migration circuit 119 transfers buffered session state changes to the live migration circuit 129 at the destination host 120. The live migration circuit 129 may then take over management of sessions. The buffered changes can be replayed to match the session state of the VM 111 at the destination host 120 with the state expected by the entities communicating via the communication links. Further, the live migration circuit 119 and/or source hypervisor 117 can switch all VM network traffic 141 over to the destination hypervisor 127 to complete the transition. VM network traffic 141 is any network traffic traversing the communication link that is not employed to manage sessions, such as data plane data (e.g. user data).

It should be noted that VM network traffic 141, session traffic 142, memory pages 143, and dirty pages 144 may be intercepted and/or corrupted while in transit. Accordingly, secure network channels 140 are established to carry such VM 111 data. A secure network channel 140 is any communication protected by security protocols to resist tampering or eavesdropping. Secure channel 140 may employ encryption and decryption to secure the communication of VM 111 data (e.g. IPSec, SSL, etc.)

While system 100 depicts transfer of VM 111 between data centers 116 and 126, it should be noted that a VM 111 may be transferred between servers in the same data center and even between CPUs 114 operating hypervisors 117 and 127 on the same host. In such case, the live migration circuit 119 may still manage sessions. Further, the live migration circuit 119 may communicate with memory 112 via direct memory access (DMA) to transfer data, such as buffered session state information, between hypervisors (e.g. when the destination host 120 is the source host 110). Employing DMA may speed communication between hypervisors 117 and 127 without requiring access to network devices, such as a Network Interface Controller (NIC).

It should be noted that system 100 is depicted as including only components relevant to the discussion herein. It should be noted that system 100 may include many other components to support the operations described herein. For example, each host 110/120 may include multiple parallel processors, network cards, memory (e.g. RAM, ROM, cache, etc.), power management systems, communication fabrics, controllers, etc. Further, the data center networks 116 and/or 126 may include network nodes to support communication, security, and other data center functions. For example, the data center networks may include server racks, top of rack (TOR) switches, end of row (EoR) switches, a core network fabric, etc. While such components are not discussed in detail herein for purposes of clarity, the omission of any such component should not be considered limiting.

Figure 2:
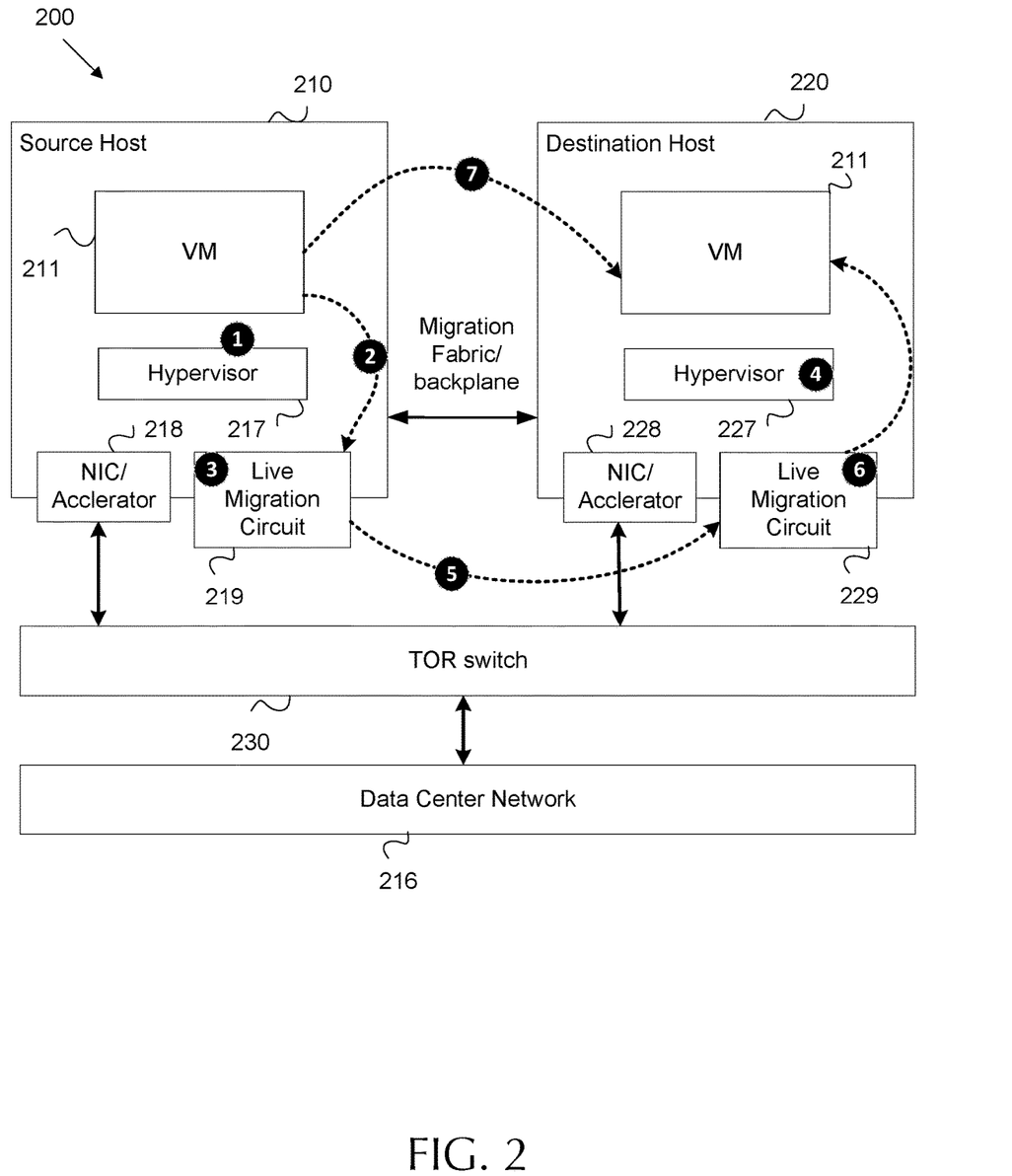
FIG. 2 is a block diagram of an embodiment of a data center network for migrating a live VM without session interruption.

FIG. 2 is a block diagram of an embodiment of a data center network 200 for migrating a live VM 211 without session interruption. The network 200 is similar to the system 100, but is implemented into a single data center network 216 for clarity of discussion. Data center network 216 is substantially similar to data center network 116 and 126, and acts as both a source and destination data center network. Data center network 216 includes a source host 210 and a destination host 220, which are substantially similar to the source host 110 and the destination host 120, respectively. The source host 210 and the destination host 220 communicate via a top of rack (TOR) switch 230. A TOR switch 230 is an example data center switch that couples servers in a data center network as part of a switching fabric. The TOR switch 230 is configured to switch and/or route packets between the servers as desired to support communication via communication links and/or communication sessions. The source host 210 includes a live migration circuit 219, a hypervisor 217, and a VM 211, which are substantially similar to the live migration circuit 119, the hypervisor 117, and the VM 111, respectively. The destination host 220 includes a live migration circuit 229 and a hypervisor 227, which are substantially similar to the live migration circuit 129 and the hypervisor 127, respectively. The destination host 220 receives the VM 211 from the source host 210.

The source host 210 includes a NIC 218 as well as various process accelerators for network communications. The NIC 218 is a network interface device employed to communicate data between host 210 and/or other devices over a network fabric. The NIC 218 may employ various networking protocols to communicate with remote devices, such as remote processor cores operating in other systems, such as remote servers. The destination host 220 includes a NIC 228 and associated accelerators that are substantially similar to NIC 218. It should be noted that NICs 218 and/or 228 may also be referred to as a host fabric interface (HFI).

In the example shown in network 200, process stages for moving VM 211 between the source host 210 and the destination host 220 are depicted by black labeled numbers with corresponding dashed arrows. At stage 1, the hypervisor 217 on the source host 210 determines to migrate the VM 211 and commences pre-migration and migration. During this stage, the hypervisor 217 converts VM 211 memory pages into packets. Such packets are sent from source host 210 to the hypervisor 227 on the destination host 220 (as noted above, this operation can be offloaded to live migration circuits 119 and 129 in some embodiments). The hypervisor 227 may begin setting up the VM 211 on the destination host 220 based on the VM 211 memory page packets. During the last phase of stage 1, stage 2 initiates. At stage 2, the source VM 211 and/or source hypervisor 217 offload packet processing and session management to the live migration circuit 219. Stage 2 may be referred to as the "Link Keep Alive" offload. After stage 2, the source hypervisor 217 at the source host 210 suspends the VM 211 and transfers the final state of the VM 211 to the destination hypervisor 227. Further, after stage 2, stage 3 initiates. During this stage the live migration circuit 219 performs the minimal amount of processing needed to keep the user data/network traffic processing and the corresponding session(s) alive. Further, the live migration circuit 219 buffers the minimal changes in the state information for the sessions corresponding to the VM 211 communication links. The live migration circuit 219 can work in conjunction with NIC and Accelerators 218 to achieve the "link keep alive" offload. It should be noted that CPU resources (e.g. operating the hypervisor 217) may not be involved in keeping the sessions alive, and can be allocated for other tasks, such as migrating other VMs. The live migration circuit 219 may be dynamically re-programmed. Hence, the live migration circuit 219 can be customized as desired to manage the "live keep alive" process to provide any specified virtual network functions and/or traffic behavior desired to keep the VM 211 sessions active while VM 211 is suspended. Accordingly, from the user perspective, the VM 211 links are still active even though the VM 211 is out of service.

Stage 4 initiates at the destination hypervisor 227 while stage 3 continues at the live migration circuit 219. At stage 4, the destination hypervisor 227 restores the VM memory 211 pages and activates the VM 211 on the destination host 220 platform based on the final state received from the source hypervisor 217 (as noted above, stage 4 can be offloaded to the live migration circuit 229 in some embodiments). Upon completion of VM 211 activation, the destination hypervisor 227 and/or VM 211 transmits a message to the live migration circuit 219 to indicate that the VM 111 restore is complete. Receiving this message at the source host 210/live migration circuit 219 initiates stage 5. At stage 5, the restore complete information is used by the live migration circuit 219 and/or source host 210 to switch VM 211 user traffic from the source host 210 to the destination host 220 (e.g. to the live migration circuit 229 at the destination host 220). This information is also used by the live migration circuit 219 on the source host 210 to transfer the buffered state information for the sessions from source live migration circuit 219 to the destination live migration circuit 229.

Stage 6 initiates upon receiving the buffered state information at the live migration circuit 229. During stage 6, the live migration circuit 229 takes over session management and forwards the buffered state changes to the hypervisor 227 and/or VM 211 on the destination host 220. Stage 6 may include replaying critical traffic that arrived during VM 211 suspension/downtime. During stage 6 the live migration circuit 229 restores any changes to the state that were recorded during VM 211 suspension/downtime into the VM 211 at the destination host, which became active at stage 4. The VM 211 at the destination host 220 reaches the updated state and initiates stage 7 by taking responsibility for session and user data processing from live migration circuit 229.

By employing the process described above, the users associated with the VM 211 sessions may not be impacted by disconnects or drops. Depending on the amount of buffering and restoring, the system 200 may achieve a near zero packet loss migration. It should be noted that the live migration circuit 219 and/or 229 may perform the minimal number of actions to keep the VM 211 links alive. Extra user data processing may be discarded in some aspects, where extra user data processing is any data processing which will not impact the sessions. Discarding such data may be application/ virtual network function specific. Such discarding may be noticed by the user, for example as reduced signal quality (e.g. a loss of some audio data in a VoIP call). However, the loss of data may be short lived from the user perspective (e.g. less than one second) and may be preferable to a communication link/session disconnect.

Figure 3:
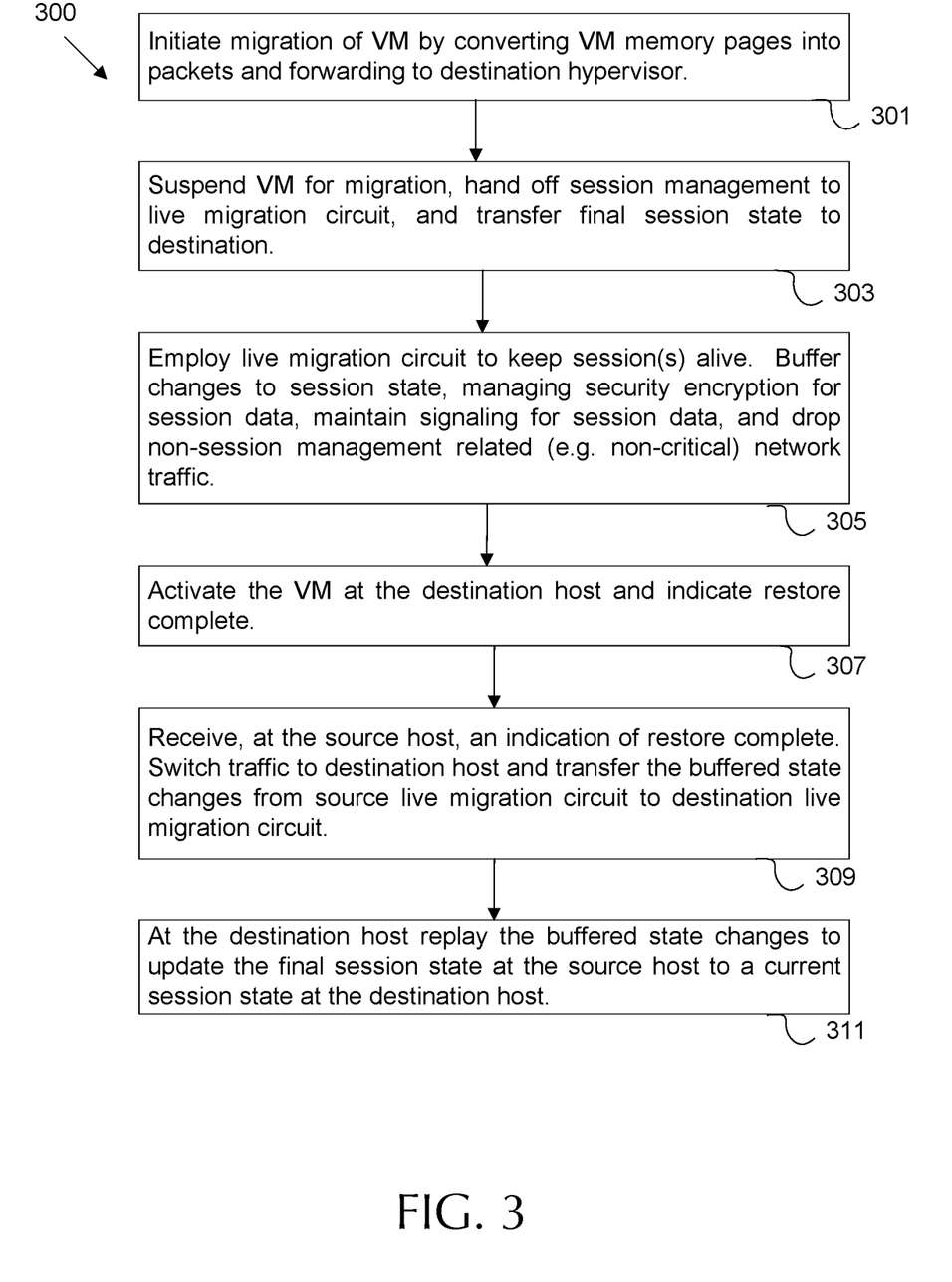
FIG. 3 is a flow chart of an embodiment of a method for migrating a live VM between hosts without session interruption.

FIG. 3 is a flow chart of an embodiment of a method 300 for migrating a live VM, such as VM 111 and/or 211 between hosts, such as hosts 116, 126, 216, and/or 226 without session interruption. Method 300 is initiated when a hypervisor/host employing a VM) to communicate network traffic over a communication link determines to migrate a VM to another hypervisor/host. At block 301, migration of the VM is initiated. VM migration may begin by converting VM memory pages into packets and forwarding the packets to the destination hypervisor. At block 303, the VM is suspended for migration to a destination host. Further session management associated with the communication link is handed off to the live migration circuit (e.g. while the VM is suspended during migration). In addition, a final session state for the VM at the source host is forwarded to the destination host.

At block 305, the live migration circuit is employed at the source host to keep the sessions associated with the communication link alive. The live migration circuit buffers changes to the session state. Further, the live migration circuit may manage security encryption of session data for the communication link as desired to keep the session alive. The live migration circuit may also perform signaling for the session while the VM is suspended during migration, for example by signaling session data. In some aspects, the live migration circuit may also drop non-critical network traffic that is unrelated to session management.

While block 305 occurs at the source host, block 307 occurs at the destination host. At block 307, the VM is activated at the destination host based on the VM memory pages and final session state from the source host. Upon completion of block 307, a message as transmitted to the source host to indicate that the VM restore is complete.

At block 309, the indication is received at the source host from the destination host. The indication indicates to the source host that the restore of the VM is complete at the destination host. The indication is employed to switch the network traffic from the source host to the destination host, for example to the destination live migration circuit. The indication is also employed to initiate transfer of the buffered session changes to the destination host, for example to the destination live migration circuit. The buffered session state changes may be any session state changes occurring to the final session state at the source host after the final session state has been forwarded to the destination host.

At block 311, the destination live migration circuit may take over session management. The live migration circuit, VM, and/or hypervisor at the destination host may replay the buffered session state changes after the VM is reactivated. Replaying the buffered state changes may update the final session state at the source host to a current session state at the destination host. The destination host may then take over normal operation of the VM.

System 100, network 200, and method 300 may reduce VM downtime during transfer to a near zero time value. Further, packet loss may be reduced to near zero as the migration time is short. Further, compute and memory resource usage may be minimized, further reducing overall migration time.

EXAMPLES

Illustrative examples of the technologies disclosed herein are provided below. An embodiment of the technologies may include any one or more, and any combination of, the examples described below.

Example 1 includes a source host for live migration of a virtual machine (VM) to a destination host, the source host comprising: a processor to: operate the VM to communicate network traffic over a communication link, initiate migration of the VM to the destination host, and suspend the VM during migration of the VM to the destination host; and a live migration circuit coupled to the processor, the live migration circuit to manage a session associated with the communication link while the VM is suspended during migration.

Example 2 includes the subject matter of Example 1, and wherein managing the session associated with the communication link includes buffering changes to a session state while the VM is suspended during migration.

Example 3 includes the subject matter of Examples 1-2, and wherein the live migration circuit is further to transfer buffered session state changes to a destination live migration circuit at the destination host for replay after the VM is reactivated on the destination host.

Example 4 includes the subject matter of Examples 1-3, and wherein managing the session associated with the communication link further includes performing signaling for the session while the VM is suspended during migration.

Example 5 includes the subject matter of Examples 1-4, and wherein the live migration circuit drops network traffic unrelated to session management while the VM is suspended during migration.

Example 6 includes the subject matter of Examples 1-5, and wherein the processor does not manage the session while the VM is suspended during migration.

Example 7 includes the subject matter of Examples 1-6, and wherein managing the session associated with the communication link includes managing security encryption of session data for the communication link while the VM is suspended during migration.

Example 8 includes the subject matter of Examples 1-7, and wherein the live migration circuit employs direct memory access (DMA) to communicate buffered session state information to the destination host when the destination host is the source host.

Example 9 includes the subject matter of Examples 1-8, and wherein the live migration circuit managing the session while the VM is suspended is implemented as a dedicated field programmable gate array (FPGA).

Example 10 includes the subject matter of Examples 1-8, and wherein the live migration circuit managing the session while the VM is suspended is implemented as a dedicated Application Specific Integrated Circuit (ASIC).

Example 11 includes a method of live migration of a virtual machine (VM) between a source host and a destination host, the method comprising: employing the VM, on the source host, to communicate network traffic over a communication link; suspending the VM during migration to the destination host; and managing, by a live migration circuit, a session associated with the communication link while the VM is suspended during migration.

Example 12 includes the subject matter of Example 11, and wherein managing the session associated with the communication link includes buffering changes to a session state while the VM is suspended during migration.

Example 13 includes the subject matter of Examples 11-12, and further comprising transferring buffered session state changes to the destination host for replay after the VM is reactivated on the destination host.

Example 14 includes the subject matter of Examples 11-13, and wherein suspending the VM includes forwarding, to the destination host, a final session state for the VM at the source host, the buffered session state changes occurring to the final session state after the final session state has been forwarded to the destination host.

Example 15 includes the subject matter of Examples 11-14, and further comprising: receiving, from the destination host, an indication that the VM is restored at the destination host; and employing the indication to switch the network traffic to the destination host and initiate transfer of the buffered session changes to the destination host.

Example 16 includes the subject matter of Examples 11-15, and wherein managing the session associated with the communication link includes managing security encryption of session data for the communication link while the VM is suspended during migration.

Example 17 includes the subject matter of Examples 11-16, and wherein managing the session associated with the communication link further includes performing signaling for the session while the VM is suspended during migration.

Example 18 includes the subject matter of Examples 11-17, and further comprising dropping network traffic unrelated to session management while the VM is suspended during migration.

Example 19 includes the subject matter of Examples 11-18, and wherein the live migration circuit managing the session while the VM is suspended is a dedicated field programmable gate array (FPGA).

Example 20 includes the subject matter of Examples 1-18, and wherein the live migration circuit managing the session while the VM is suspended is a dedicated Application Specific Integrated Circuit (ASIC).

Example 21 includes an apparatus for live migration of a virtual machine (VM) between a source host and a destination host, the apparatus comprising: a processing means to: operate the VM to communicate network traffic over a communication link, initiate migration of the VM to the destination host, and suspend the VM during migration of the VM to the destination host; and a live migration means to manage a session associated with the communication link while the VM is suspended during migration.

Example 22 includes the subject matter of Example 21, and wherein managing the session associated with the communication link includes buffering changes to a session state while the VM is suspended during migration.

Example 23 includes the subject matter of Examples 21-22, and wherein the live migration means is further to transfer buffered session state changes to a destination host for replay after the VM is reactivated on the destination host.

Example 24 includes the subject matter of Examples 21-23, and wherein managing the session associated with the communication link further includes performing signaling for the session while the VM is suspended during migration.

Example 25 includes the subject matter of Examples 21-24, and wherein the live migration means drops network traffic unrelated to session management while the VM is suspended during migration.

Example 26 includes the subject matter of Examples 21-25, and wherein managing the session associated with the communication link includes managing security encryption of session data for the communication link while the VM is suspended during migration.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Also, when reference is made in this application to a method having two or more defined steps or operations, the defined steps or operations can be carried out in any order or simultaneously, unless the context excludes those possibilities.

Although specific embodiments of the invention have been illustrated and described for purposes of illustration, it will be understood that various modifications may be made without departing from the spirit and scope of the invention. Accordingly, the invention should not be limited except as by the appended claims.

We claim:

1. An apparatus comprising:
   a live migration circuit at a source host; and
   a processor to support operation of a virtual machine (VM) at the source host that maintains a session to communicate network traffic over a communication link during live migration, including:
   responsive to an initiation of a migration of the VM to a destination host during the session:
      convert the VM's memory pages, including a session state, into packets,
      forward the packets to the destination host,
      suspend operation of the VM, and
      offload management of the session to the live migration circuit and offload packet processing associated with the session from a central processing unit to the live migration circuit,
   wherein the offloaded management of the session includes the live migration circuit to perform a first plurality of session related functions and a second plurality of session related functions;
      the first plurality of session related functions to, while operation of the VM is suspended, at least:
         for the communication link associated with the VM to be migrated, determine the session used for packet processing;
         buffer changes to the session state of the determined session;
         maintain at least a portion of session-related signaling for the determined session, wherein maintaining session related signaling includes dropping network traffic packets over the communication link not associated with keeping the communication link active without terminating the determined session; and
      the second plurality of session related functions to, while operation of the VM is resumed, at least:
         transfer the session state changes to a destination live migration circuit at the destination host, wherein the VM is restored at the destination host based on the VM memory pages and the buffered changes to the session state;
         obtain an indication that the restore of the VM is complete at the destination host; and
         switch the network traffic from the source host to the destination live migration circuit at the destination host.

2. The apparatus of claim 1, wherein the session state is a first session state, the first plurality of session related functions includes the live migration circuit to forward a second session state to the destination live migration circuit, the second session state occurring prior to the VM being suspended.

3. The apparatus of claim 2, further including the live migration circuit to transfer the first session state to the destination live migration circuit at the destination host for replay after operation of the VM is resumed on the destination host.

4. The apparatus of claim 1, the first plurality of session related functions includes the live migration circuit to manage security encryption of session data for the communication link.

5. The apparatus of claim 2, further including the live migration circuit to implement direct memory access (DMA) to communicate buffered session state information to the destination host when the destination host is also a source host.

6. The apparatus of claim 1, the live migration circuit includes a field programmable gate array (FPGA).

7. The apparatus of claim 1, the live migration circuit includes an Application Specific Integrated Circuit (ASIC).

8. A method comprising:
   employing a virtual machine (VM), on a source host, to maintain a session to communicate network traffic over a communication link during live migration, including:
   responsive to an initiation of a migration of the VM to a destination host during the session:
      converting the VM's memory pages, including a session state, into packets,
      forwarding the packets to the destination host,
      suspending operation of the VM, and
      offloading management of the session to a live migration circuit, and offloading packet processing associated with the session from a central processing unit to the live migration circuit; and
   performing, by the live migration circuit, a first plurality of session related functions and a second plurality of session related functions;
      the first plurality of session related function include, while operation of the VM is suspended at least:
         for the communication link associated with the VM to be migrated, determining the session used for packet processing;
         buffering changes to the session state of the determined session;
         maintaining at least a portion of session-related signaling for the determined session; and
         dropping network traffic packets over the communication link not associated with keeping the communication link active without terminating the determined session; and
      the second plurality of session related functions include, while operation of the VM is resumed, at least:
         transferring the session state changes to a destination live migration circuit at the destination host, wherein the VM is restored at the destination host based on the VM memory pages and the buffered changes to the session state;

obtaining an indication that the restoring of the VM is complete at the destination host; and switching the network traffic from the source host to the destination live migration circuit at the destination host.

9. The method of claim 8, wherein the session state is a first session state, performing the first plurality of session related functions includes, by the live migration circuit, forwarding a second session state to the destination live migration circuit, the second session state occurring prior to the VM being suspended.

10. The method of claim 9, performing the second plurality of session related functions further includes transferring the first session state to the destination host for replay.

11. The method of claim 10, wherein suspending the VM includes forwarding, to the destination host, the second session state for the VM at the source host, the first session state occurring after the second session state has been forwarded to the destination host.

12. The method of claim 11, further includes:
receiving, from the destination host, an indication that operation of the VM is resumed at the destination host; and
employing the indication to switch the network traffic to the destination host and initiate transfer of the first session state to the destination host.

13. The method of claim 8, the first plurality of session related functions includes the live migration circuit to manage security encryption of session data for the communication link.

14. The method of claim 8, the live migration circuit includes a field programmable gate array (FPGA).

15. An apparatus comprising:
a live migration circuit at a source host couple to a processor, wherein the processor supports operation of a virtual machine (VM) at the source host that maintains a session to communicate network traffic over a communication link during live migration, including:
responsive to responsive to an initiation of a migration of the VM to a destination host during the session:
convert the VM's memory pages, including a session state, into packets, forward the packets to the destination host, suspend operation of the VM, and offload management of the session to the live migration circuit, and offload packet processing associated with the session from a central processing unit to the live migration circuit, the offloaded management of the session includes the live migration circuit to perform a first plurality of session related functions and a second plurality of session related functions, the live migration circuit performing:
the first plurality of session related functions include the live migration circuit to, while operation of the VM is suspended, at least:
for the communication link associated with the VM to be migrated, determine the session used for packet processing;
buffer changes to the session state of the determined session;
maintain at least a portion of session-related signaling for the determined session, wherein maintaining session related signaling includes dropping network traffic packets over the communication link not associated with keeping the communication link active without terminating the determined session;
perform packet processing for the session from a central processing unit to the live migration circuit; and the second plurality of session related functions to include the live migration circuit to, while operation of the VM is resumed:
transfer the session state changes to a destination live migration circuit at the destination host, wherein the VM is restored at the destination host based on the VM memory pages and the buffered changes to the session state;
obtain an indication that the restore of the VM is complete at the destination host; and
switch the network traffic from the source host to the destination live migration circuit at the destination host.

16. The apparatus of claim 15, further including the live migration circuit to transfer the session state data to the destination live migration circuit at the destination host for replay after operation of the VM is resumed on the destination host.

17. The apparatus of claim 16, further including the live migration circuit to implement direct memory access (DMA) to communicate the session state data to the destination host when the destination host is also a source host.

18. The apparatus of claim 15, the first session related functions to further include the live migration circuit to manage security encryption of session data for the communication link.

19. The apparatus of claim 15, the live migration circuit includes a field programmable gate array (FPGA).

20. The apparatus of claim 15, the live migration circuit includes an Application Specific Integrated Circuit (ASIC).

21. At least one non-transitory computer readable medium comprising instructions that, when executed, cause processing circuitry to:
support operation of a virtual machine (VM) at a source host that maintains a session to communicate network traffic over a communication link during live migration, including:
responsive to an initiation of a migration of the VM to a destination host during the session,:
convert the VM's memory pages, including a session state, into packets,
forward the packets to the destination host,
suspend operation of the VM, and
offload management of the session to a live migration circuit at the source host and offload packet processing associated with the session from a central processing unit to the live migration circuit,
wherein the offloaded management of the session includes the live migration circuit to perform a first plurality of session related functions and a second plurality of session related functions;
the first plurality of session related functions to, while operation of the VM is suspended, at least:
for the communication link associated with the VM to be migrated, determine the session used for packet processing;
buffer changes to the session state of the determined session;
maintain at least a portion of session-related signaling for the determined session, wherein maintaining session related signaling includes dropping network traffic packets over the communication link not associated with keeping the communication link active without terminating the determined session; and
the second plurality of session related functions to, while operation of the VM is resumed, at least:

transfer the session state changes to a destination live migration circuit at the destination host, wherein the VM is restored at the destination host based on the VM memory pages and the buffered changes to the session state;

obtain an indication that the restore of the VM is complete at the destination host; and switch the network traffic from the source host to the destination live migration circuit at the destination host.

22. The at least one non-transitory computer readable medium of claim 21, wherein the instructions, when executed, cause the processing circuitry to transfer the session state data to the destination live migration circuit at the destination host for replay after operation of the VM is resumed on the destination host.

23. The at least one non-transitory computer readable medium of claim 21, wherein the instructions, when executed, cause the processing circuitry to implement direct memory access (DMA) to communicate the session state data to the destination host when the destination host is also a source host.

24. The at least one non-transitory computer readable medium of claim 21, wherein the instructions, when executed, cause the processing circuitry to manage security encryption of session data for the communication link.

25. The at least one non-transitory computer readable medium of claim 21, wherein the live migration circuit includes a field programmable gate array (FPGA).

26. The at least one non-transitory computer readable medium of claim 21, wherein the live migration circuit includes an Application Specific Integrated Circuit (ASIC).

* * * * *